United States Patent
Dunser et al.

(10) Patent No.: US 10,236,782 B2
(45) Date of Patent: Mar. 19, 2019

(54) MODULE HAVING MEASUREMENT SIGNAL FEEDBACK VIA A GALVANICALLY ISOLATED CONVERTER

(71) Applicant: Tridonic GmbH & Co. KG, Dornbirn (AT)

(72) Inventors: Mathias Dunser, Feldkirch (AT); Christoph Vonach, Dornbirn (AT); Martin Mohr, Hohenems (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/785,891

(22) PCT Filed: Apr. 25, 2014

(86) PCT No.: PCT/AT2014/000085
§ 371 (c)(1),
(2) Date: Oct. 21, 2015

(87) PCT Pub. No.: WO2014/172727
PCT Pub. Date: Oct. 30, 2014

(65) Prior Publication Data
US 2016/0105121 A1    Apr. 14, 2016

(30) Foreign Application Priority Data

Apr. 26, 2013 (DE) ........................ 10 2013 207 700

(51) Int. Cl.
*H02M 3/335* (2006.01)
*H05B 33/08* (2006.01)
*H02M 1/00* (2006.01)

(52) U.S. Cl.
CPC .... *H02M 3/33553* (2013.01); *H05B 33/0815* (2013.01); *H05B 33/0887* (2013.01); *H02M 2001/0003* (2013.01)

(58) Field of Classification Search
CPC ........... H05B 33/0887; H05B 33/0815; H02M 3/33553
See application file for complete search history.

(56) References Cited

U.S. PATENT DOCUMENTS 8,111,011 B1 * 2/2012 Tu ...................... H05B 33/0872
315/117
2005/0259448 A1   11/2005 Koike
(Continued)

OTHER PUBLICATIONS

International Search Report issued in connection with International Application No. PCT/AT2014/000085 dated Sep. 18, 2014.

*Primary Examiner* — Seokjin Kim
(74) *Attorney, Agent, or Firm* — The H.T. Than Law Group

(57) ABSTRACT

The invention relates to a module for operating at least one illuminant, preferably at least one LED, said module having at least one electrically insulating barrier, which separates a primary side that can be supplied, originating from a mains voltage, from a secondary side of the module, from which the at least one illuminant can preferably be supplied. A secondary-side passive circuit is provided, which is connected in a supply path to a primary-side control circuit across the barrier via a galvanically isolated converter. The primary-side control circuit is designed to apply a test signal with predetermined temporal development to the secondary-side passive circuit (via the converter) and simultaneously to monitor a measurement signal generated thereby on the secondary side and fed back into the supply path, more particularly to monitor an increase of current in the converter.

14 Claims, 3 Drawing Sheets

(56) References Cited

U.S. PATENT DOCUMENTS

| | | |
|---|---|---|
| 2009/0001954 A1 | 1/2009 | Morota |
| 2012/0169245 A1 | 7/2012 | Chen |
| 2012/0306394 A1 | 12/2012 | Ikeda |
| 2012/0306407 A1 | 12/2012 | He et al. |
| 2014/0077724 A1* | 3/2014 | Sawada .............. H02M 3/157 315/307 |
| 2015/0326117 A1* | 11/2015 | Tischler ............ H05B 33/0815 315/185 R |

* cited by examiner

MODULE HAVING MEASUREMENT SIGNAL FEEDBACK VIA A GALVANICALLY ISOLATED CONVERTER

FIELD OF THE INVENTION

The present invention relates to a module for operating at least one illuminant/illuminant system, preferably at least one LED.

SUMMARY OF THE INVENTION

In particular, the invention relates to an LED module or an LED converter which comprises an electrically insulating barrier, for example, a so-called SELV-barrier (safety extra-low voltage barrier), that is, a safety extra low-voltage barrier, which isolates, for example, circuit regions with a safety extra-low voltage, from other circuit parts.

More particularly, the invention relates to a module of which the output-power/output-current/output-voltage (in the following, only the term output-voltage will be used) can be adjusted by selecting the output voltage via a selection input of the module. For example, at least one selection resistor can be connected to the selection input, and the output voltage can then be adjusted dependent upon a resistance value of the connected selection resistor.

A control circuit of the module accordingly detects a measurement signal which reproduces the resistance value of the connected resistor. In the following, this concept will be designated as "Iselect". More particularly, a voltage- or current measurement signal can be picked up in the selection resistor with regard to the voltage/current through the illuminant (Iselect). The invention further relates to modules, which comprise a temperature measurement unit (for example, NTC, negative temperature coefficient resistor, PTC, positive temperature coefficient resistor, or thermistor).

The control circuit can therefore detect, alternatively or additionally, at least one further measurement signal, which reproduces a temperature investigated by the temperature measurement unit. This can be, for example, a temperature coefficient, which is investigated, more particularly, by means of a variable electrical resistor, the value of which is varied in a reproducible manner through a temperature change. In this case, the measurement signal indicates, in turn, a resistance value. In general, the measurement signals are voltages/currents which either reproduce resistance values or can be determined on the basis of their resistance values.

The temperature is investigated, for example, in order to vary the output voltage of the module dependent upon the investigated temperature, for example, in order to deactivate the module in the case of excessively high/excessively low temperatures. This concept is referred to in the following as "ITM" (intelligent temperature management).

The above named electrically insulating barrier divides the module with reference to the barrier into, a primary side and a secondary side, which is also designated, for example, as a SELV side. In this context, the primary side can often be supplied directly or indirectly originating from a mains power supply (AC/DC voltage/current), while the connectable illuminant can be supplied, directly or indirectly, originating from the secondary side.

The invention is accordingly directed towards modules in which the detection and evaluation of the measurement signals is implemented through a primary-side control circuit. That is, that preferably no control circuit for the detection and evaluation, more particularly, no IC, ASIC or microcontroller, is provided on the secondary side.

Even in the case of relatively simple applications, it is often desirable in this context to pass information or respectively measurement signals from the secondary side of the barrier to the primary-side control unit.

For example, it is desirable to pass to the primary side a temperature information, for example, which is read out via a secondary-side temperature measurement resistor (NTC, PTC). In this case, picking up the temperature information on the secondary side is desirable because the temperature measurement unit can thus be arranged close to the illuminant.

Furthermore, the selection resistor for adjusting the output voltage which can be connected to the selection input of the module is a component which can be inserted and replaced by a human user, especially with differently dimensioned resistors.

In this context, the human user can come into contact with conducting parts of the module, for which reason, the secondary side of the module can be operated with the safety extra-low voltage (low-voltage power supply, SELV or LVPS, low-voltage power source). Accordingly, it is often desirable to pick up the voltage- or current measurement signal with regard to the voltage/current through the illuminant at the selection resistor and to feed this back to the primary side. Conversely, the primary-side control circuit on the primary side can then be supplied with a relatively higher voltage.

With the prior art, in a relatively effort-intensive manner, it is necessary for this purpose to provide an A/D converter fed by a low-voltage power supply provided on the secondary side, which then feeds back the named signals to the control unit on the primary side of the electrically insulating barrier, for example, by means of an optocoupler.

The invention is therefore also intended to reduce effort with regard to circuitry and accordingly also to reduce costs, and more particularly, to dispense with the A/D converter, the optocoupler and the low-voltage power supply.

The invention accordingly discloses a device and a method according to the independent claims. Further developments of the invention form the subject matter of the dependent claims.

In one aspect, the invention discloses a module for operating at least one illuminant, preferably at least one LED, with at least one electrically insulating barrier which isolates a primary side capable of being supplied originating from a mains supply voltage, from a secondary side of the module, from which the at least one illuminant can preferably be supplied, wherein a secondary-side passive circuit is provided, which is connected across the barrier in a supply path via a galvanically isolated converter to a primary-side control circuit, and wherein the primary-side control circuit is designed to apply a test signal with predetermined temporal development (via the converter) to the secondary-side passive circuit and, at the same time, to monitor a measurement signal, more particularly an increase of current in the converter, generated thereby on the secondary side, and fed back into the supply path.

The passive circuit can comprise at least two resistors on the secondary side, which are connected to a switching element, which is designed in such a manner that, in the case of an application of the test signal to the primary side, it first connects the supply path via one resistor/both resistors and, with a time interval, connects the supply path via both resistors/one resistor.

The passive circuit can comprise at least two resistors on the secondary side which are connected to at least two switching elements.

The switching elements can be designed in such a manner that, in the case of an application of the test signal to the primary side, the supply path is initially connected via the first resistor and, with a time interval, the supply path is connected, additionally or alternatively, via the second resistor.

The switching elements can be designed in such a manner that, in the case of an application of the test signal to the primary side, the secondary-side resistors are activated/deactivated in a binary-permuted manner, wherein the permutation can comprise repetitions.

The primary side control circuit can detect the measurement signals in the converter with a time interval, which reproduce/reproduces a resistance value of the resistor/resistors connected momentarily in the supply path in the secondary-side passive circuit.

By preference, no voltage/current supply may be provided on the secondary side.

The detection of the measurement signals can be implemented in a repeated and more particularly in a cyclical manner.

The control circuit can implement an extrapolation on the basis of at least two detected measurement signals.

The extrapolation can be implemented in reverse time.

The extrapolation can determine a resistance value of the passive circuit at the time of application of the test signal.

In a further aspect, the invention discloses a ballast with a module as described above.

In another aspect, the invention discloses a lamp with a module and/or a ballast, as described above.

In yet another aspect, the invention discloses a method for the passive feedback of a measurement signal from the secondary side of an electrically insulating barrier to a primary-side control circuit arranged on the primary side relative to the former, which is connected across the barrier in a supply path via a galvanically isolated converter to a secondary-side passive circuit, wherein the primary-side control circuit applies a test signal with predetermined temporal development to the secondary-side passive circuit and, at the same time, monitors a measurement signal, more particularly an increase of current in the converter, generated thereby and fed back via the supply path.

BRIEF DESCRIPTION OF THE DRAWINGS

The invention will now also be described with reference to the Figs. The Figs. show.

DETAILED DESCRIPTION OF THE PREFERRED EMBODIMENTS

The invention relates to the bridging of the electrically insulating barrier (SELV barrier) of the module. Information is to be fed back from the secondary side of the barrier to the primary side with minimal effort with regard to circuitry. According to the present invention, the information-communicating element is a galvanically isolated converter, especially a transformer, of which the secondary winding is connected to a passive measurement circuit, preferably a resistor.

If a test signal (abrupt change in current or voltage) from the control unit on the primary side of the barrier is applied to the primary winding, it is possible, by evaluating the temporal development of the current characteristic on the primary side, to draw inferences with regard to the electrical parameters of the secondary-side measurement circuit connected to the secondary winding.

In the case that a resistor is connected to the secondary side, this resistor, so to speak, attenuates the converter, and the absolute value of the current rising on the primary side, for example, in the case of an abrupt change in voltage, depends upon the resistance value on the secondary side.

In the simplest case, through an absolute (one-off) detection of a measurement signal, more particularly of a current, it is therefore possible, in the case of an application of an abrupt change in voltage to the primary side, to draw inferences, after a predetermined time after the application of the abrupt change, with regard to the resistance value on the secondary side.

In general, therefore, a test signal is applied to the primary side, and a measurement signal is detected in the converter, also on the primary side, the characteristic of which is influenced by secondary-side passive components.

This measurement can also be refined by detecting the current not just once, but several times after predetermined time intervals. Accordingly, if, for example, the gradient of the increase of current on the primary side can be investigated, tolerances of the inductances of the converter can be compensated.

Figure 1:
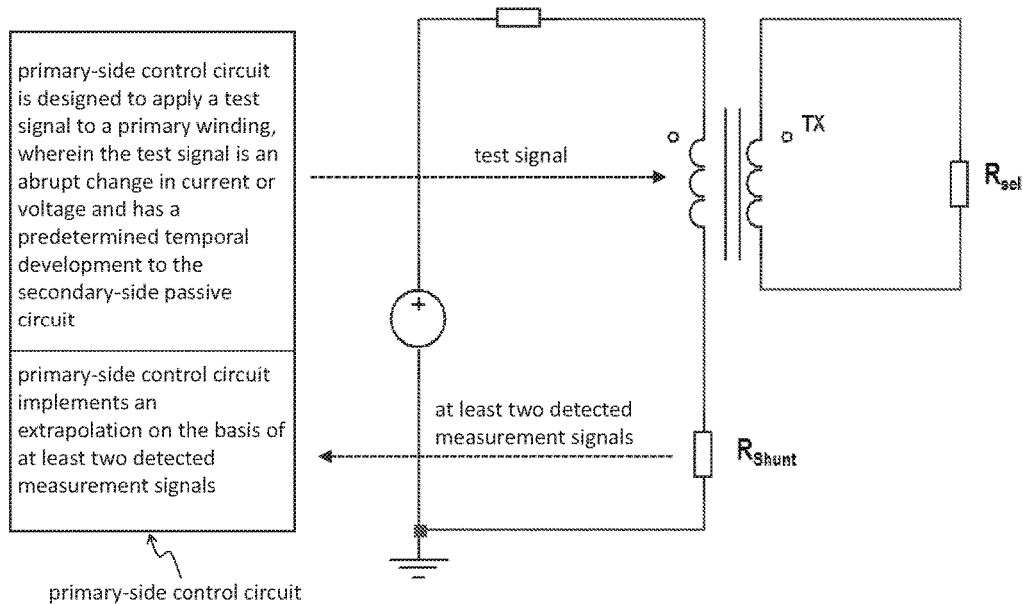
FIG. 1 an exemplary circuit arrangement according to the invention.

FIG. 1 shows, by way of example, a circuit arrangement which presents a simple embodiment. In this context, a resistor $R_{sel}$ is connected on the secondary side in parallel to a converter TX. If a test signal is applied to the primary-side winding of the converter, the latter is stimulated. Directly after the application of the test signal, current flows through the resistor $R_{sel}$ (offset current), and the current through the converter begins to rise. On the primary side, a measurement signal, which, more particularly, reproduces the current through the resistor, is detected in a measurement resistor (Shunt) $R_{Shunt}$.

In this context, the measurement signal can be determined in two ways.

First, a converter with high inductance can be used. Directly after the application of the test signal, the measurement signal then reproduces the current through the resistor $R_{sel}$, because the current in the converter rises very slowly.

Figure 2:
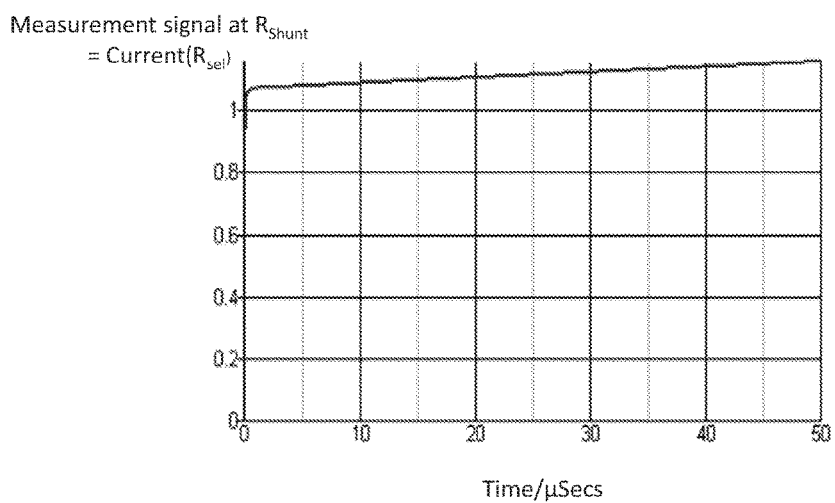
FIG. 2 an exemplary characteristic of a measurement signal.

This is shown by way of example in the diagram in FIG. 2.

Alternatively, the measurement signal can be detected at a defined/predetermined time. Since the inductance is known, the (offset) signal and the current through the resistor can be determined.

Figure 3:
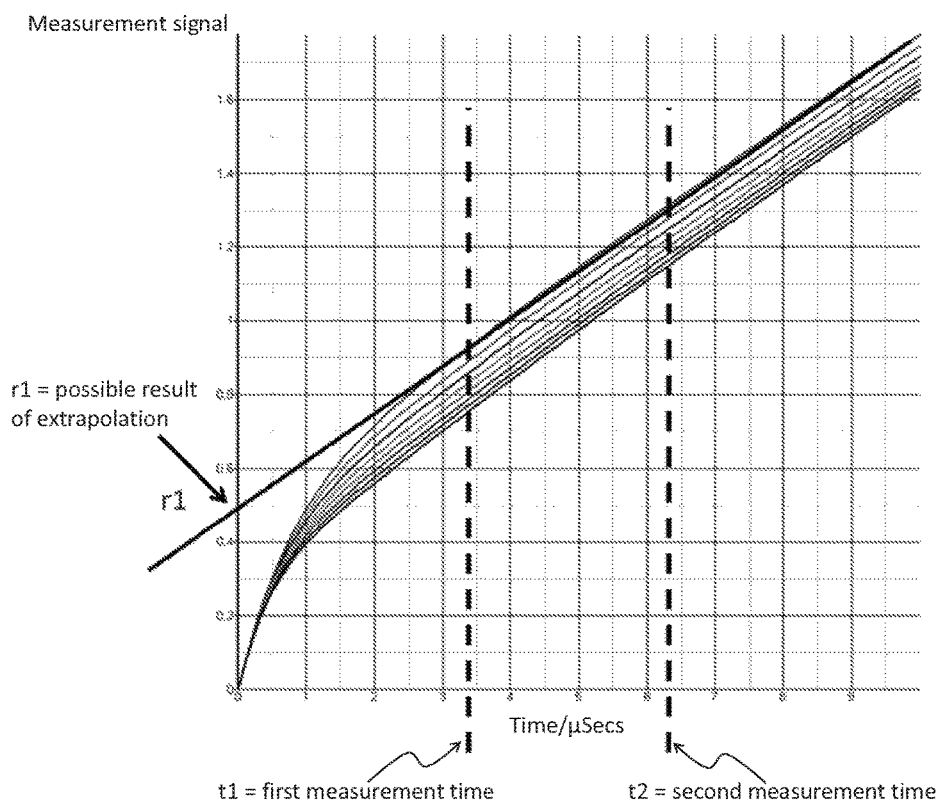
FIG. 3 in schematic view, an extrapolation implemented by the control circuit.

However, it is disadvantageous that the detected measurement signal is dependent upon the inductance of the converter. Accordingly, at least two measurement signal detections are preferably implemented, and an extrapolation is performed, which provides information about the measurement signal after the application of the test signal. This is visualised in FIG. 3 wherein, by way of example, the dashed lines represent the measurement times t1, t2, while the continuous line indicates the extrapolation. The arrow designates a possible result r1 of the extrapolation, which takes place in reverse time or backward to time zero. The extrapolation r1 determines a resistance value of the passive circuit at the time of the application of the test signal. More particularly, it is therefore not a matter of determining the resistance value exactly, but rather of detecting changes in resistance by comparison, that is relatively.

The circuit arrangement illustrated in FIG. 1 allows only one measurement signal to be detected, which reproduces the resistance value or respectively the temporal change of a resistor.

However, if more measurement signals are to be fed back, a different solution must be found. Since the converter is, in general, the most expensive part of the module, a solution with several converters would be conceivable but, in fact, not advantageous.

Figure 4:
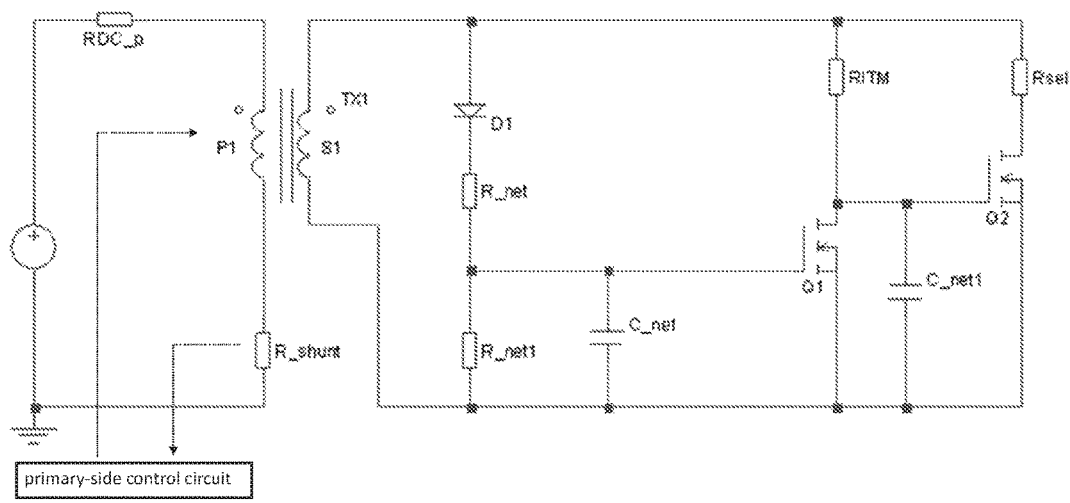
FIG. 4 an exemplary first variant of a circuit arrangement according to the invention with several secondary-side resistors.
Figure 5:
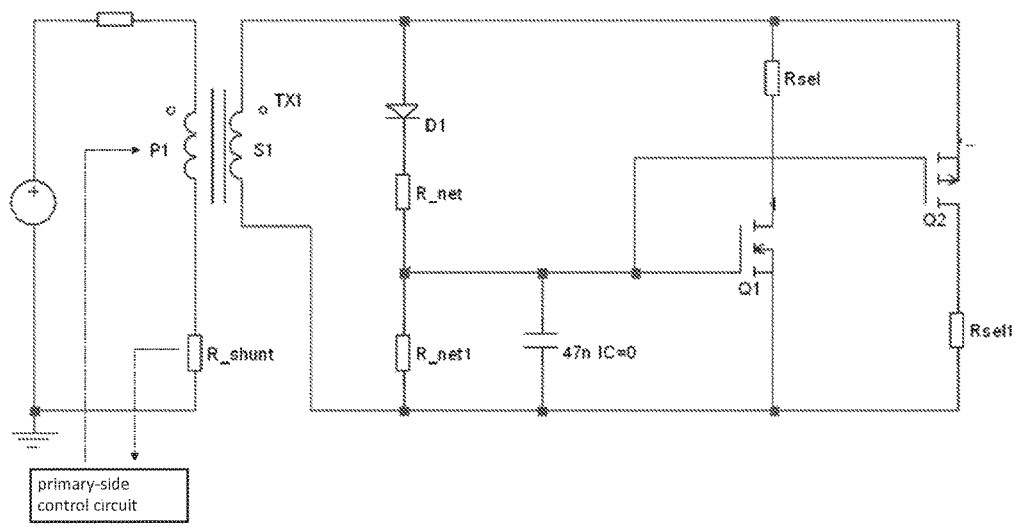
FIG. 5 an exemplary second variant of a circuit arrangement according to the invention with several secondary-side resistors.

As shown in FIGS. 4 and 5, the reading out of the information via the transformer can, however, take place within a time multiplex.

In FIGS. 4 and 5, this is shown in that two different resistors $R_{SEL}$ and respectively $R_{ITM}$ are to be read out. For this purpose, these resistors, which therefore encode the information, are each connected in series to a transistor (FET, MOSFET) Q1, Q2. The time resolution for reading out the information is triggered by a different charging of differently dimensioned capacitors $C_{NET1}$ and respectively $C_{NET}$ over time.

In the example of FIG. 4, the transistor Q2 is first connected through and accordingly, in a first time segment, the value of the resistor $R_{SEL}$ is read out via the transformer.

The capacitor $C_{NET}$ is charged more slowly. When it is sufficiently charged, it will deactivate the transistor Q2 via the transistor Q1 and accordingly terminate the reading out of the resistor $R_{sel}$.

At the same time, the resistor $R_{ITM}$ is now read out by activating the transistor Q1.

The difference between the circuit arrangement from FIG. 4 and the circuit arrangement from FIG. 5 is primarily that, in the former, the temporal distortion occurs through the switching of two n-channel FETs, while in the latter, one n-channel and one p-channel FET are used.

This can, of course, also be expanded to even more complex secondary-side passive networks, which can also comprise more than two resistor combinations. Accordingly, for example, a switching element can be provided for each resistor, and the resistors can be in binary permutation, so that, in each case, only one resistor or a given resistor combination, is activated on the secondary side.

In the present case, the different resistors $R_{ITM}$ and $R_{SEL}$ relate to a different physical information, so that the primary-side measurement circuit therefore obtains different information in different time segments. However, these resistors could also represent a higher-value coding in the faint of several bits, which resolve the same information with a relatively finer gradation. For example, both resistors could represent the selection resistor $R_{SEL}$.

By preference, the passive circuit on the secondary side is a passive network in the sense that no internal low-voltage supply is provided, but only a connection across the barrier takes place by means of the converter.

A DC voltage $V_{DC}$ can be applied selectively (abrupt change) to the primary side of the transformer. The temporal development of the current characteristic is measured across the measuring resistor $R_{Shunt}$. The specification of the primary side can be important primarily with regard to the application of the abrupt voltage change or respectively of the measurement resistor $R_{Shunt}$.

The first time segment in which the first information is read out, relates to a first defined group of applied abrupt voltage changes, while the second segment then relates to the application of subsequent abrupt voltage changes. What is involved is therefore not two different time segments after the application of a single abrupt voltage change. The abrupt voltage changes can be achieved by selective connection or application of the DC voltage $V_{DC}$. This selective and repeated connection can be implemented, for example, with a specified and variable frequency or pulse width.

Indeed, with several abrupt voltage changes, a type of continuous excitation or continuous, incremental charging of the capacitors which switch the transistors is achieved.

The invention claimed is:

1. A module for operating at least one illuminant with at least one electrically insulating barrier, which isolates a primary side capable of being supplied originating from a mains voltage, from a secondary side of the module,
    wherein a secondary-side passive circuit is provided, which is connected in a supply path across the barrier via a galvanically isolated converter to a primary-side control circuit, and
    wherein the primary-side control circuit is designed to apply a test signal to a primary winding, wherein the test signal is an abrupt change in current or voltage and has a predetermined temporal development to the secondary-side passive circuit and, at the same time, to monitor a measurement signal, generated in response to the test signal on the secondary side and fed back into the supply path
    wherein the control circuit implements an extrapolation on the basis of at least two detected measurement signals, and
    wherein the extrapolation determines a resistance value of the passive circuit at the time of the application of the test signal.

2. The module according to claim 1, wherein, on the secondary side, the passive circuit provides at least two resistors, which are connected to at least two switching elements.

3. The module according to claim 2, wherein the switching elements are designed in such a manner that, in the case of an application of the test signal to the primary side, the supply path is first connected via the first resistor and, with a time interval, the supply path is additionally or alternatively connected via the second resistor.

4. The module according to claim 2, wherein the switching elements are designed in such a manner that, in the case of an application of the test signal to the primary side, the secondary-side resistors are activated in a binary-permuted manner.

5. The module according to claim 1, wherein the detection of the measurement signal takes place in a repeated manner.

6. The module according to claim 1, wherein the extrapolation is implemented toward the time of the application of the test signal.

7. The module according to claim 1 incorporated into a ballast.

8. The module according to claim 1 incorporated into a lamp.

9. A method for the passive feedback of a measurement signal from the secondary side of an electrically insulating barrier to a control circuit arranged on the primary side of said electrically insulating barrier, which is connected across the barrier in a supply path via a galvanically isolated converter to a secondary-side passive circuit,
- wherein the primary-side control circuit applies a test signal to a primary winding, wherein the test signal is an abrupt change in current or voltage and has predetermined temporal development to the secondary-side passive circuit and, at the same time, monitors a measurement signal generated in response to the test signal on the secondary side and fed back into the supply path
- wherein the control circuit implements an extrapolation on the basis of at least two detected measurement signals, and
- wherein the extrapolation determines a resistance value of the passive circuit at the time of the application of the test signal.

10. The module according to claim 1, wherein the at least one illuminant comprises at least one LED.

11. The module according to claim 1, wherein the at least one illuminant is supplied from the secondary side of the module.

12. The module according to claim 4, wherein the permutation comprises repetitions.

13. The module according to claim 5, wherein the detection of the measurement signal takes place in a cyclical manner.

14. The method according to claim 9, wherein the measurement signal comprises an increase of current within the converter.

* * * * *